UNITED STATES PATENT OFFICE.

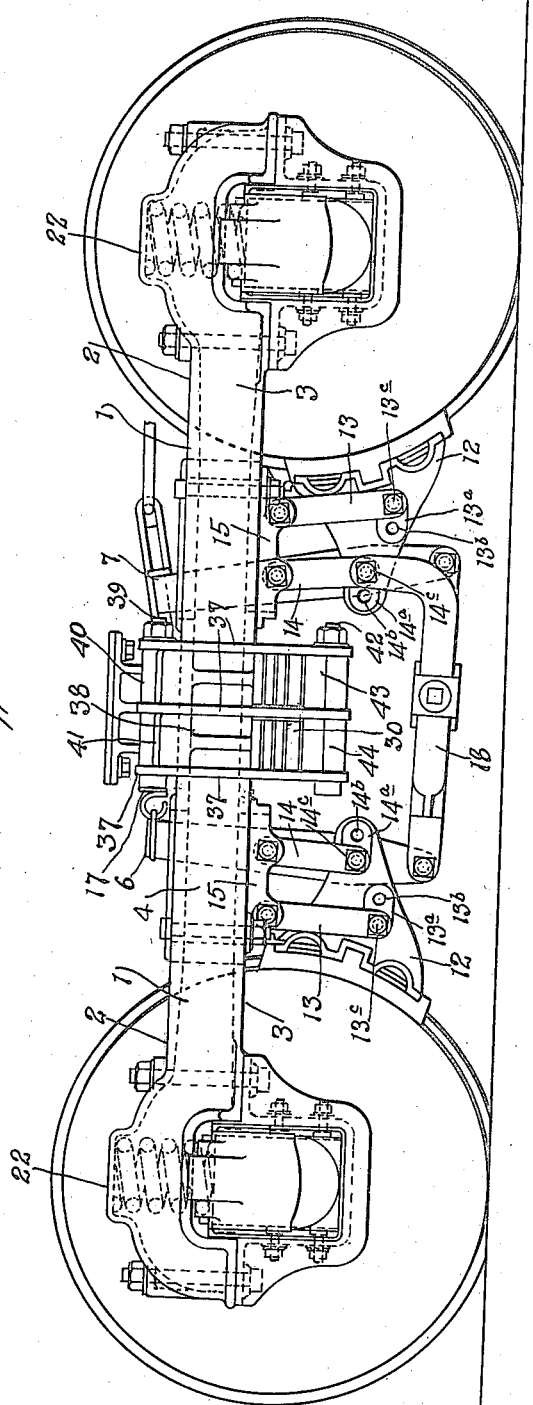

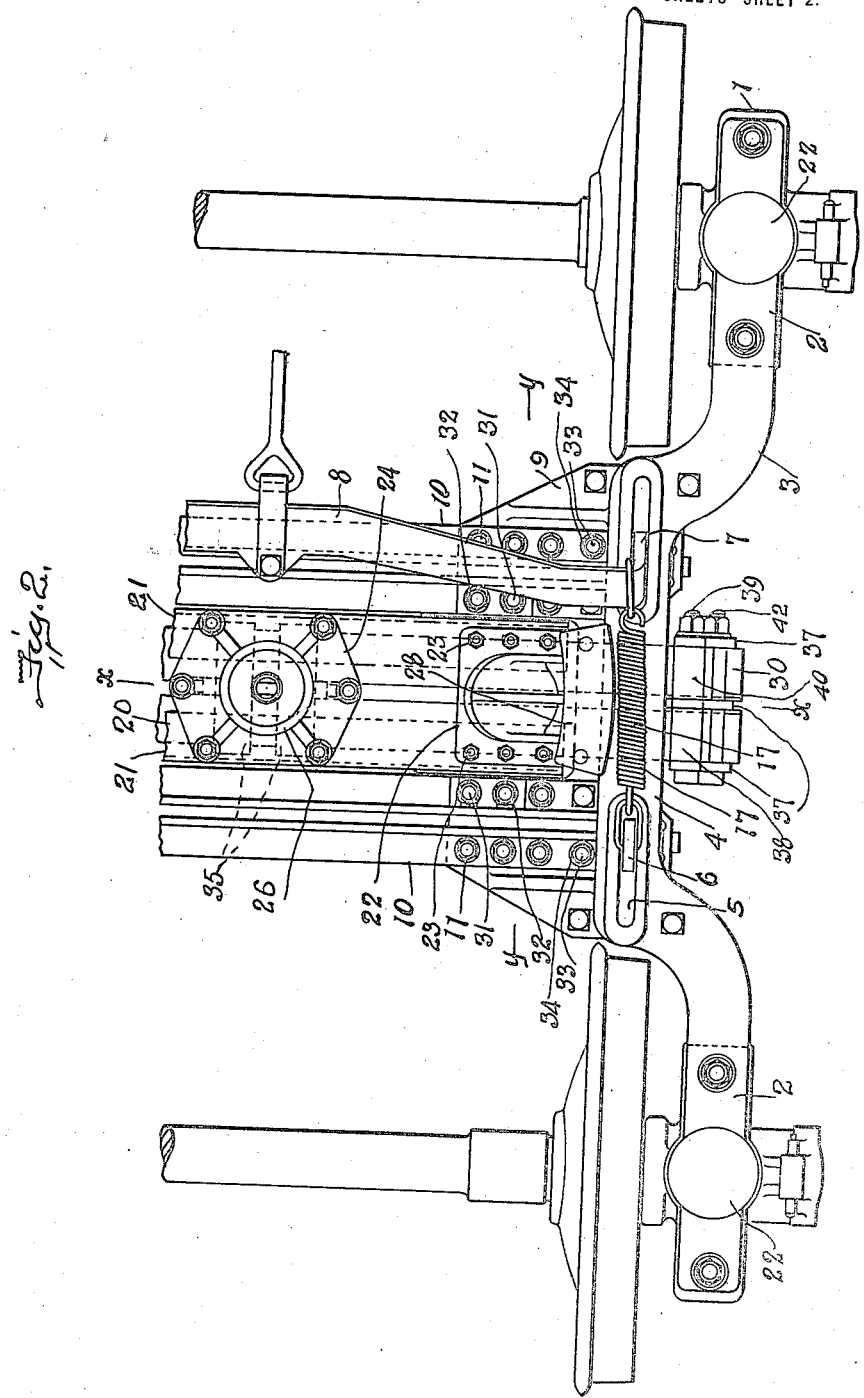

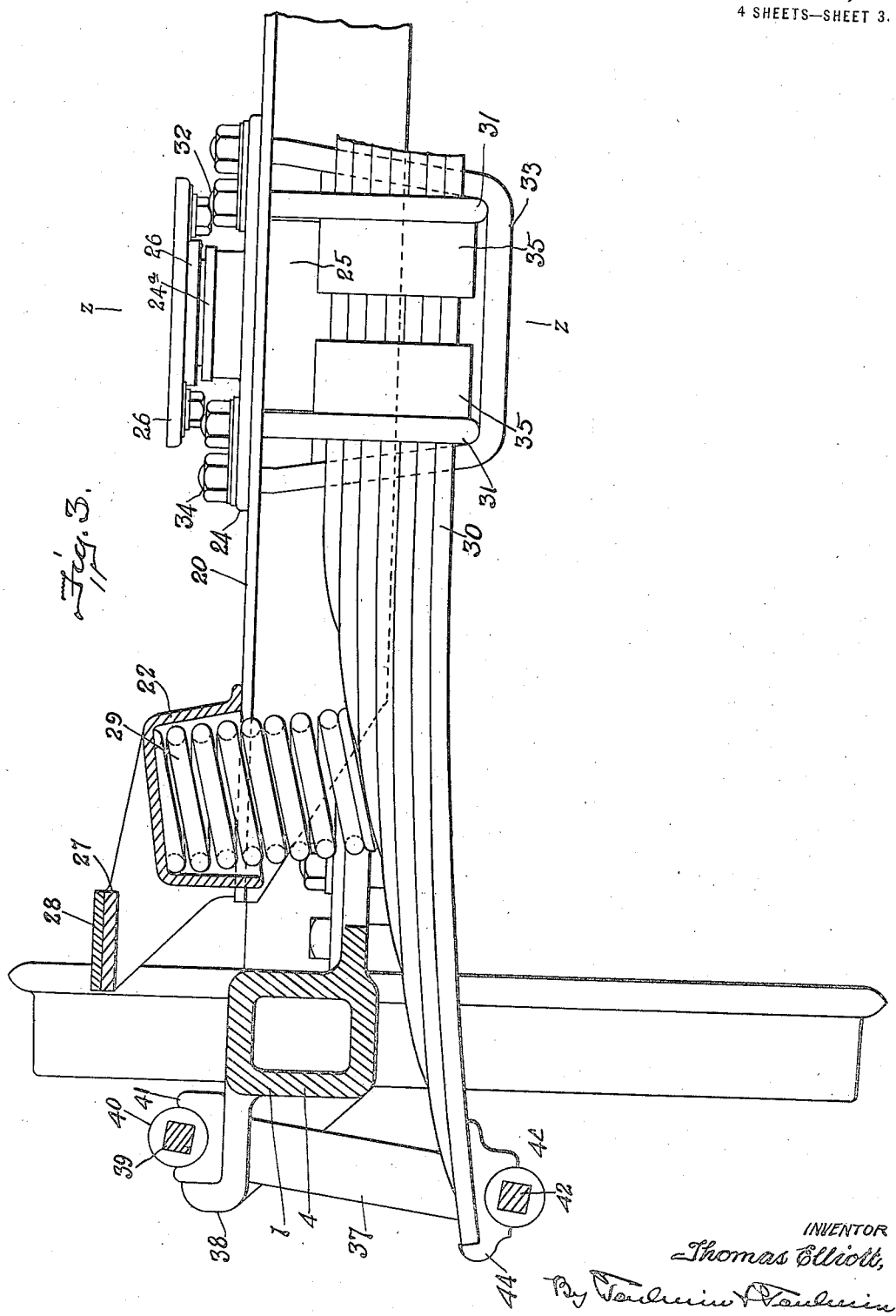

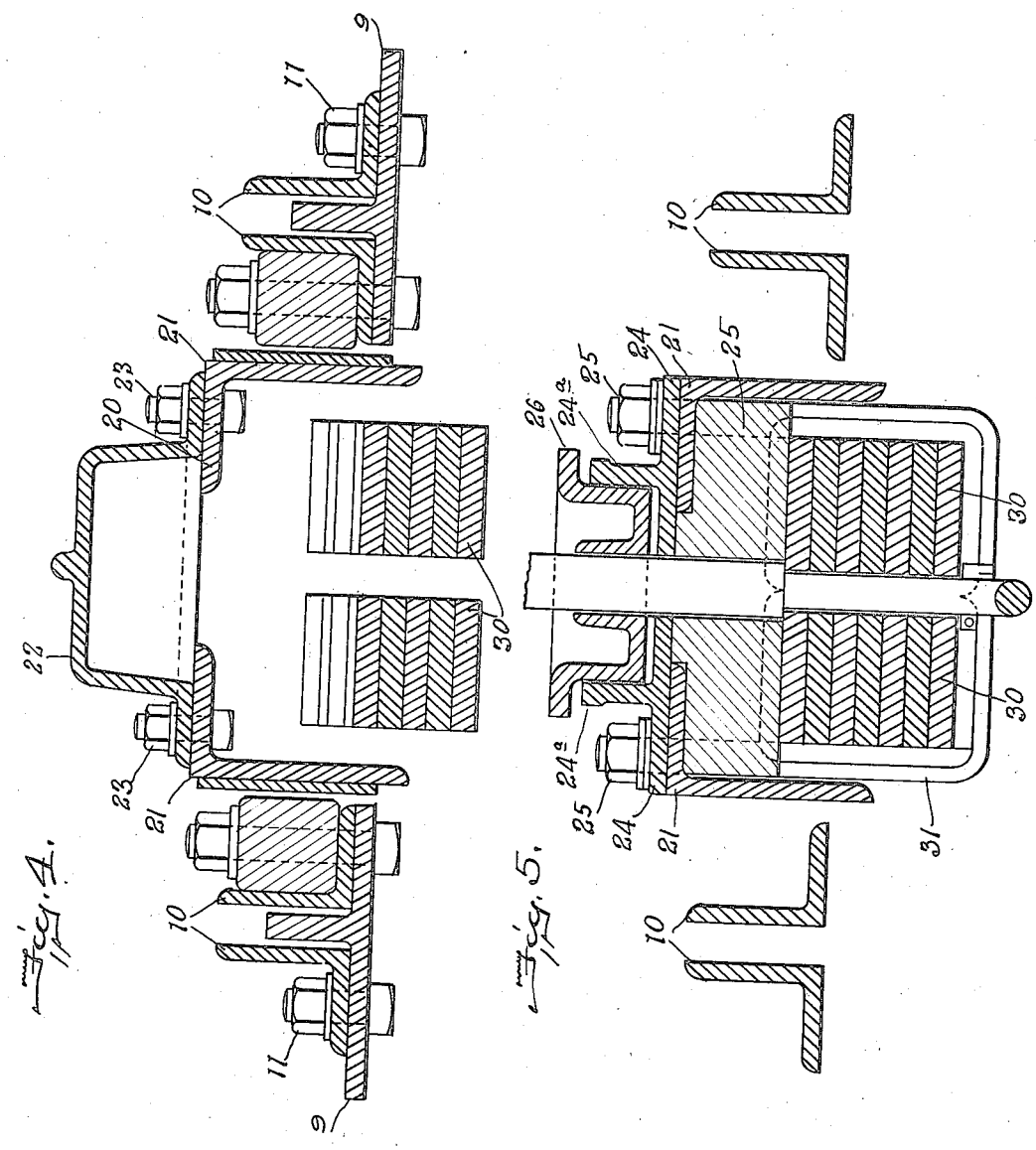

THOMAS ELLIOTT, OF CINCINNATI, OHIO, ASSIGNOR TO THE CINCINNATI CAR COMPANY, OF CINCINNATI, OHIO, A CORPORATION OF OHIO.

RAILWAY-CAR TRUCK.

1,386,853.

Specification of Letters Patent. Patented Aug. 9, 1921.

Application filed March 21, 1921. Serial No. 454,032.

*To all whom it may concern:*

Be it known that I, THOMAS ELLIOTT, a citizen of the United States, residing at Cincinnati, in the county of Hamilton and State of Ohio, have invented certain new and useful Improvements in Railway-Car Trucks, of which the following is a specification, reference being had therein to the accompanying drawing.

This invention relates to improvements in railway car trucks, particularly cars of the type generally used in interurban and city railway systems.

The essential features of my invention are:—

(1.) Side beams for the truck frame offset to bring their middle portion inward to a line substantially coincident with the wheels, for the several purposes of locating the swinging suspension links by which the car body is sustained outside of the truck side members; of giving accessibility to the truck suspension devices which heretofore have been as far inside of the side members of the truck as were the wheels; of shortening the distance between the middle portion of one side truck member and the other so as to reduce the span of the unsupported part of the transoms or cross beams which extend from one side member to the other; and of locating the point of connection between the side members and the gusset plates which support the transoms at a place inside of the location of the brake levers, so that the brake levers can have their fore and aft movement without being interfered with by the gusset plates.

(2.) Springs for supporting the car body located transversely of the truck, with their outer portions suspended from the side members of the truck frame at points outside of such members, combined with suitable bolsters by which the car bodies are supported and the weight transferred to the middle portions of the springs, this organization permitting the body to swing laterally when traveling on curves instead of rolling over toward the outside, as results from the common construction; this spring arrangement also preventing longitudinal travel of the car body, as when starting and stopping, by reason of the rigidity of the transverse springs as against flexure in a longitudinal direction, as also by reason of the rigidity of the suspension links between the springs and side members of the truck as against lost motion longitudinally.

(3.) The provision of coiled springs in addition to the leaf springs, the coiled springs being located between the bolster and the leaf springs at points where the leaves of the leaf springs are more in number than they are at and near the supporting links, thus in effect reinforcing the leaf springs and enabling them to carry a greater weight; this arrangement permitting all of the leaf springs for the various weights of car bodies to be made uniform but to be supplemented by the coiled springs when the bodies pass a given point in respect to their weight. This results in economy in manufacture because it permits of using uniform leaf springs on all the cars of various weights, the coiled spring being omitted or added according to the weight of the particular body to be mounted.

In the accompanying drawings:

Figure 1 is a side elevation of a railway car truck embodying my invention;

Fig. 2 is a plan view, on a larger scale, of approximately one-half of such a truck;

Fig. 3 is a partial end view and cross section on the line $x$—$x$ of Fig. 2;

Fig. 4 is a cross section on the line $y$—$y$ of Fig. 2; and

Fig. 5 is a transverse sectional view on the line $z$—$z$ of Fig. 3.

My truck is of standard type in so far as concerns the wheels and axles and the boxes which contain the axle journals and are connected to the side members 1 of the truck frame. These side members, however, embody one of the main features of this invention. They are constructed of portions 2 located substantially as usual outside of the wheels; portions 3 which deflect inwardly; and a portion 4 into which the portions 3 merge, the portion 4 being substantially in line with the two adjacent wheels. Preferably this side member or beam is constructed of cast steel and is hollow after the manner of a box, as seen in Fig. 3.

Thus the outer portions of this beam are outside of the wheels and the inner or body portion is substantially in line with the wheels, the beams being inwardly deflected for this purpose, resulting in the end portions being in an outer plane and the middle portion in an inner plane. The middle portion of the beam is slotted at 5 longitudinally to accommodate the brake levers 6 and 7, the latter lever being integral with the pull beam 8. It will be seen at once that in this way the brake levers are accommodated as to their necessary position with respect to the brake shoes and wheels without interfering with or being interfered by the gusset plates 9 which preferably are made integral with the side beam. And in this way the length of the gusset plates may be increased and extended so as to lessen the span between the plates on one beam and those on the other and so shorten the unsupported portions of the transoms or cross beams 10. This permits of making these beams lighter than otherwise. I also make them in pairs, as shown more particularly in Figs. 2 and 4, where two pairs are shown, one pair attached to each gusset plate by a succession of bolts and nuts 11. By making the transoms in pairs I am enabled to make each transom smaller and lighter and therefore more flexible than if each transom were heavy enough to perform the service of a pair of transoms. This reduction of the size of each transom results in making the truck frame more flexible so as to better yield when, for instance, the wheels pass over depressions in the tracks, yet I do not weaken the truck frame by these provisions for adding to its flexibility.

It will be seen also that by reason of this peculiar type of side beam the brake heads 12 and their supporting links 13 and 14 are exposed and made perfectly accessible, being suspended from the middle or inner portion of the beam by means of plates 15 secured thereto and carrying the upper ends of the links 13 and 14. The lower ends of these longer links 13 are pivoted to bosses 13ª formed on the brake heads 12. The bosses have two holes, designated 13ᵇ, into either of which the pivot pin 13ᶜ may be inserted. Similarly, the shorter links 14 are pivoted at their lower ends to the bosses 14ª having two holes 14ᵇ, in either of which the pivot pin 14ᶜ may be inserted.

In this way the lower ends of the links may have their pivotal points placed near to or farther from the wheels, which is for the purpose of taking up the wear that takes place on the brake shoe and wheel periphery. When the parts are new the links are pivoted to the bosses by inserting the pivot pins in the holes nearest the brake shoe. When the parts become worn the adjustment is made to place the pivot pins in the holes farthest from the brake shoe.

In the old way, with the straight beams, the brake heads and the hanging links, in order to be in line with the wheels, have been inside of and remote from the side beams and have been suspended from a point inside of the beams or on the inside faces of the beams and in this way have been rendered inaccessible and less observable when being under inspection for the purposes of determining whether they are out of order. These disadvantages are overcome by my type of side beam and the brake heads and hanging links are presented in full view and readily within reach.

And it will be understood that as the links 13 and 14 are of unequal length and as each connects with the head 12, as before stated, the movement of the head when the links 13 and 14 are swung will be such as to maintain the parallelism of the brake head or its rub plate 16 with the wheel periphery. The advantage is the even wear of the rub plate and the wheel periphery and particularly the grip of the rub plate on the wheel throughout the length of the rub plate. The faces of the rub plates 16 are made on the same curvature as that of the periphery of the wheel and then when mounted in these heads which are sustained in this arrangement of links, the rub plates are kept parallel with the wheel faces.

The brake levers 6 and 7 are pivotally hung on the pivots 14ᶜ so that when the pivot pin 14ᶜ is adjusted, with the link 14, to either of the holes 14ᵇ, the lever is likewise adjusted. These remarks apply to both the levers 6 and 7.

A spring 17 connects the lever 6 with the lever 7, the latter being connected to and preferably integral with the pull beam 8. By making the levers 7 integral with the pull beam the levers act as spacers to keep the brake heads in the proper position laterally, spacing one with respect to the other. And by the construction described the brake heads and links can be assembled on the bench and later readily attached to the beams of the truck by merely securing the plates 15 to the beams. And likewise they can be readily detached from the beams.

While the means for taking up the "slack" or properly spacing the brake heads with respect to each other form no part of this invention I have illustrated a well known type of slack adjuster generally indicated at 18.

Referring now to the instrumentalities for mounting the car body on the truck, 20 designates the bolster of two angle beams 21 (see Fig. 4) which extend from side to side of the truck. At their outer ends they are connected together by a strong bracket 22 bolted or otherwise strongly secured to them, as indicated at 23, so that the ends of the two beams comprising the bolsters are rigidly and reliably united. The middle portions of these bolster beams are secured together by a center plate 24 by means presently mentioned. Thus the built-up bolster while light, is strong and rigid. The angle iron construction affords an open space underneath the bolster for the accommodation of the leaf springs, as will presently appear, a filling, 25, say of wood, being preferably placed between the bolster and the springs.

A center bearing 26 supports the car body in the usual or any conventional way and is fitted within a collar 24ᵃ of the plate 24, as shown in Fig. 5.

And the outer ends of the bolster, through the instrumentality of the bracket 22 is provided with side bearings 27 with which contact car plates 28 which are conveniently attached to the car body. The under side of each bracket 22 constitutes a pocket within which is located and secured a spiral supplementary spring 29 which is used only when very heavy car bodies are to be mounted on the truck, say bodies weighing 3500 pounds, or in excess thereof. In such cases these supplementary springs 29 are used while when bodies of lighter weight are to be carried by the trucks, these springs are omitted. But in all cases the transverse leaf springs 30 are employed as they constitute the main spring element. The supplemental springs bear upon them at a point substantially midway between their center and ends and where the leaves are greater in number than near the ends. In this way the heavier loads are sustained by the combined springs as efficiently as the lighter bodies are sustained by the leaf springs alone. These latter springs generally occupy the space within the bolster to which they are secured by heavy transverse clips 31 which extend around the two springs, as seen in Fig. 2, and thence through the bolster and plate 24 and are held by nuts 32.

Other clips 33 longitudinal of the springs and located between them, as shown in Fig. 2, pass under the clips 31 and thence through the bolster 20 and plate 24 and have nuts 34. Clamps 35 hold the spring leaves together and filling 25 form a filling between the springs and the under side of the top flanges of the bolster. In this manner the springs in this middle portion are properly connected with the bolster, permitting them to duly flex under the weight and vibrations of use.

At their ends the springs are suspended from the side members 1 by means of links 37, preferably 3 in number, at each side, as shown in Fig. 1. The upper ends of the links are sustained by brackets 38 projecting from the middle portion 4 of the side beam. Bars 39 pass through the links and through sleeves 40 which latter rest in shoes 41 suitably secured to the bracket 38. In turn, the springs are attached to the links at their lower ends through similar bars 42 which pass through the links and their lower sleeve 43, the sleeves bearing on shoes 44 suitably secured to the ends of the springs.

By these arrangements and devices the body is supported primarily through transverse springs, supplemented in the case of very heavy bodies by the coiled springs 29 and is permitted to swing laterally as the cars travel on curves as distinguished from the car bodies merely rolling over toward the outside on a theoretical longitudinal axis, as in the old way of mounting bodies. Again, as the leaf springs are rigid in a fore and aft direction and likewise the bolster is maintained against longitudinal movement by fitting against or being in close relation to the adjacent transoms 10, the car body is prevented from longitudinal motion or lurches, a very valuable result.

I have before remarked upon the advantages and utility of this new type of side beam of the truck and of the advantages which flow from its use and the resulting arrangement and organization of the mechanism which coact therewith.

Having thus fully described my invention, what I claim as new and desire to secure by Letters Patent, is:—

1. In a car truck, the combination, with side beams having an inner portion located in a plane inward of that of the outer portions, of a bolster adapted to sustain a car body, a transverse leaf spring support secured to the bolster near the middle portion and having its ends secured to the side beams.

2. In a car truck, the combination, with side beams having inner portions in a plane inward of the outer portions, of a bolster adapted to sustain a car body, a leaf spring support secured to the bolster near the middle portion and having its ends projected beneath and laterally beyond said inner portions of the beams, and links connecting said ends with said portions of the beams.

3. In a car truck, the combination, with side beams having inner portions located in planes inward of that of the outer portions and substantially in line with the wheels, and having brake-lever slots also in line with the wheels, gusset plates secured thereto inward of said slots and transoms secured to the gusset plates, of a bolster adapted to sustain the weight of a car body, a transverse leaf spring support secured to the bolster and having its ends projected beneath and beyond the inner portions of the beams, brackets on the beams, links swung from the brackets and connected with the ends of the spring support, said parts being within a line extending from one outer portion to the other of the beams, brake heads suspended from said inner portions of the beams, and brake levers pivoted thereto and adapted to travel in said slots.

4. In a car truck, the combination, with side beams whose inner portions are in a plane inward from that of the end portions, and transoms connecting said side beams together, of a bolster adapted to support a car body, and transverse leaf springs secured to the bolster and suspended at their outer ends to the inner portion of said beams.

5. In a car truck, the combination, with side beams whose inner portions are in a plane inward of that of the outer portions, gusset plates secured to the inner portions and transoms secured to the gusset plates, the inward position of the middle portions of the beams and gusset plates acting to shorten the span of the unsupported portions of the transoms, of a bolster adapted to support the weight of the car body and locate it between the transoms, and transverse springs secured to the bolster and hung by swinging links from the inner portions of the side beams, the bolster and springs being adapted to permit the body to swing laterally when the truck is traveling on curves.

6. In a car truck, the combination, with side beams whose inner portions are in a plane inward of that of the outer portions, gusset plates secured to said inner portions, and transoms in pairs secured to the gusset plates, of a bolster adapted to sustain the car body located in the space between adjacent transoms, transverse leaf springs secured to the under side of the bolster, links mounted at one end on brackets carried by the inward portions of the side beams and sustaining at their other ends the outer portions of the leaf springs, said springs affording resilient support vertically and said springs and links permitting side swing and with the bolster preventing longitudinal movement of the body.

7. In a car truck, the combination, with side beams whose inner portions are in a plane inward of that of the outer portions, gusset plates secured to the inner faces of the inward portions and transoms in pairs secured to the gusset plates, of a bolster located between the adjacent transoms, the side beams being box-like, the transoms rectangular and the bolster channel-like in cross section, leaf springs whose middle portion is within the channel of the bolster and whose outer portions extend below and laterally beyond the side beams, devices to secure the springs to the bolster, and links supported on the outside of the inward portion of the beams and supporting the outer portions of the leaf springs.

8. In a car truck, the combination, with side beams whose inner portions are in a plane inward of the outer portions, and transoms connecting together the inner portions of the beams, of a bolster adapted to sustain a car body, transverse leaf springs secured to the bolster and suspended from the inner portions of the side beams, and supplemental springs located between the bolster and the leaf springs and adapted to transfer weight from the bolster to the leaf springs.

9. In a car truck, the combination, with side beams having inner portions in a plane inward of that of the outer portions, and having brake-lever slots, of brake heads sustained by the beams and brake levers fulcrumed to the beams and occupying said slots, gusset plates sustained by the beams inward of the slots and transoms secured to the gusset plates, of a bolster adapted to sustain a car body, transverse leaf springs secured to the bolster, and links connecting the outer portions of the leaf springs to the inward portion of the beams.

10. In a car truck, the combination, with side beams having middle portions located in a plane inward of the outer portions and substantially in line with the wheels, and having brake-lever slots, of brake heads suspended from the beams and having actuating levers pivoted to the beams and occupying each one of said slots.

11. In a car truck, a side beam having its middle portion in a plane inward of that of the outer portions, and gusset plates secured to said inner portion of the beam.

12. In a car truck, a side beam having its inner portion in a plane inward of that of the outer portions, and having brake-lever slots in said inner portion, and gusset plates secured to said portion at a point farther inward than said slots.

13. In a car truck, the combination, with a side beam having end portions which form exclusive supporting members of the beam located wholly on the outer side of the wheels, thence extended inward between the wheels, and a middle portion connected to such inward extensions and located in a plane substantially in line with the wheels, of brake heads suspended from the beam and located substantially in line with said middle portion.

14. In a car truck, the combination, with a side beam having a middle portion located in a plane inward of the outer portions and substantially in line with the wheels and having slots also in line with the wheels, of brake heads suspended from the beam and located in line with said inner portion, and brake levers pivoted to the beam connected to the brake heads and located at one end within said slots.

In testimony whereof, I affix my signature.

THOMAS ELLIOTT.